US006646850B1

(12) United States Patent
Bergmann et al.

(10) Patent No.: US 6,646,850 B1
(45) Date of Patent: Nov. 11, 2003

(54) HIGH-VOLTAGE POWER BREAKER HAVING AN OUTLET FLOW CHANNEL

(75) Inventors: Ralf Bergmann, Berlin (DE); Hold Dienemann, Berlin (DE); Joerg Hagen, Berlin (DE); Hartmut Knobloch, Berlin (DE); Volker Lehmann, Treuenbrietzen (DE); Friedrich Loebner, Berlin (DE); Michael Punger, Berlin (DE); Claudia Wiesinger, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 10/009,604

(22) PCT Filed: Jun. 9, 2000

(86) PCT No.: PCT/DE00/01918

§ 371 (c)(1),
(2), (4) Date: Dec. 11, 2001

(87) PCT Pub. No.: WO00/77809

PCT Pub. Date: Dec. 21, 2000

(30) Foreign Application Priority Data

Jun. 11, 1999 (DE) ........................................ 199 28 080

(51) Int. Cl.[7] .................................................. H02H 9/06

(52) U.S. Cl. ....................... 361/120; 361/119; 361/115; 361/113; 361/117; 361/12; 218/53; 218/54

(58) Field of Search ................................ 361/120, 113, 361/115, 117, 119, 112, 114, 12, 14; 218/53, 54

(56) References Cited

U.S. PATENT DOCUMENTS 3,928,738 A * 12/1975 Brier et al.
4,236,053 A 11/1980 Sasaki et al.
5,750,949 A * 5/1998 Rees et al.
6,040,970 A * 3/2000 Lehmann et al.
6,177,643 B1 * 1/2001 Marin et al.
6,410,873 B1 * 6/2002 Chyla et al.
6,462,295 B1 * 10/2002 Knobloch et al.

FOREIGN PATENT DOCUMENTS

| | | |
|---|---|---|
| DE | 29 47 957 A1 | 12/1980 |
| DE | 32 11 272 A1 | 4/1983 |
| DE | G 93 14 779.1 | 1/1994 |
| EP | 0 075 668 A2 | 4/1983 |
| EP | 0 177 714 A2 | 4/1986 |
| EP | 0 195 904 A1 | 10/1986 |
| EP | 0 515 267 A1 | 11/1992 |
| EP | 0 785 562 A1 | 7/1997 |
| FR | 2 709 596 A1 | 3/1995 |

* cited by examiner

*Primary Examiner*—Dean A. Reichard
*Assistant Examiner*—Ha Nguyen
(74) *Attorney, Agent, or Firm*—Morrison & Foerster LLP

(57) ABSTRACT

A high-voltage power breaker includes two arcing contact pieces which are separated from one another when disconnected and between which an arc is struck in an arcing area. The arcing area is filled with a quenching gas, where the quenching gas has been heated by the arc flowing out from a constriction point of an insulating nozzle. The insulating nozzle surrounds the arcing area, through at least one outlet flow channel which has a number of areas which the quenching gas passes through successively. The first area which faces the constriction point of the nozzle has a specific flow resistance which is less than that of the constriction point. The first area in the outlet flow direction of the quenching gas is followed by at least one second area, one third area and one fourth area. The specific flow resistance of the second and fourth areas are each greater than the specific flow resistance of the immediately preceding area in the outlet flow direction. The specific flow resistance of the third area is less than that of the second area.

20 Claims, 8 Drawing Sheets

HIGH-VOLTAGE POWER BREAKER HAVING AN OUTLET FLOW CHANNEL

CLAIM FOR PRIORITY

This application claims priority to International Application No. PCT/DE00/01918 which was published in the German language on Jun. 9, 2000.

TECHNICAL FIELD OF THE INVENTION

The invention relates to a high-voltage power breaker having two arcing contact pieces which are separated from one another when disconnected and between which an arc is struck, possibly in an arcing area filled with a quenching gas, with a quenching gas which has been heated by the arc flowing out from the constriction point of an insulating nozzle which surrounds the arcing area, through at least one outlet flow channel, which has a number of areas which the quenching gas passes through successively.

BACKGROUND OF THE INVENTION

DE-U 93 14 779.1 and DE-A 29 47 957 describe such a high-voltage power breaker.

In the known power breakers, an arc is in each case struck between two arcing contact pieces during disconnection, is blown by a quenching gas, and is in consequence intended to be quenched and prevented from restriking. A heating area is often provided, in which quenching gas which has been heated up by the arc is stored at high pressure until the next current zero crossing of the current to be switched, in order then to flow back to the arcing area when the pressure drops in the arcing area, and to cool the quenching gas there. In order to achieve effective cooling, the quenching gas must then be able to flow through an outlet flow channel into an expansion area.

In order to prevent the inner walls of an encapsulating enclosure of a power breaker from being damaged or contaminated by contaminated hot quenching gases, the quenching gas is cooled and deionized in a cooling device. Such cooling devices have, for example, what are referred to as mesh coolers in the form of perforated plates and metal meshes, in which the interaction surface area for the hot quenching gas is extremely large.

The cooling of the quenching gas also prevents ionized quenching gas from flowing into the switching path between the arcing contact pieces when another switching process takes place shortly afterwards.

It has been found that, for an optimum switching response, a certain build-up of the quenching gas is required in the outlet flow channel, although an excessively large build-up, for example due to a dense metal mesh through which the quenching gas has to flow, can impede arc quenching.

SUMMARY OF THE INVENTION

In one embodiment of the invention, there is a high-voltage power breaker. The power breaker includes, for example, two arcing contact pieces which are separated from one another when disconnected and between which an arc is struck in an arcing area filled with a quenching gas which has been heated by the arc, an insulating nozzle surrounding the arcing area, the insulating nozzle including a constriction point from which the quenching gas flows in an outlet flow direction through at least one outlet flow channel having a number of areas which the quenching gas passes through successively, wherein a first area faces the constriction point of the nozzle and has a specific flow resistance which is less than that of the constriction point, the first area in the outlet flow direction of the quenching gas is followed by at least a second area, a third area and a fourth area, in which a specific flow resistance of the second area and of the fourth area, respectively, is greater than a specific flow resistance of an immediately preceding area in the outlet flow direction, and the specific flow resistance of the third area is less than that of the second area.

In another aspect of the invention, the fourth area, whose specific flow resistance is greater than that of the preceding area, is formed by a radial deflection apparatus to quench gas flow.

In another aspect of the invention, the second and fourth areas, which have a higher specific flow resistance than their respective preceding areas, each have cross-sectional constrictions in the outlet flow channel.

In still another aspect of the invention, the cross-sectional constrictions are in the form of nozzles.

In another aspect of the invention, at least one of the areas having a higher specific flow resistance than that of the respective preceding area is in the form of a check valve.

In another aspect of the invention, each check valve has a linearly moving plate which may close an opening.

In yet another aspect of the invention, at least one of the check valves has at least one closure flap which can pivot about a hinge.

In another aspect of the invention, at least one of the areas having a higher specific flow resistance than that of the respective preceding area is in the form of a body provided with a plurality of through-flow openings.

In another aspect of the invention, at least one of the areas having a higher specific flow resistance than that of the respective preceding area has a flow damping device.

In still another aspect of the invention, the outlet flow channel extends from the nozzle constriction point to a drive side, and at least one of the areas having a higher specific flow resistance than that of the respective preceding area follows, in the outlet flow direction, a drive-side vacuum interrupter to which one of the arcing contact pieces is fitted.

In another embodiment of the invention, there is a method of designing a high-voltage power breaker. The method includes, for example, providing two arcing contact pieces which are separated from one another when disconnected and between which an arc is struck in an arcing area filled with a quenching gas which has been heated by the arc, providing an insulating nozzle surrounding the arcing area, the insulating nozzle including a constriction point from which the quenching gas flows in an outlet flow direction through at least one outlet flow channel having a number of areas which the quenching gas passes through successively, wherein a first area faces the constriction point of the nozzle and has a specific flow resistance which is less than that of the constriction point, the first area in the outlet flow direction of the quenching gas is followed by at least a second area, a third area and a fourth area, in which a specific flow resistance of the second area and of the fourth area, respectively, is greater than a specific flow resistance of an immediately preceding area in the outlet flow direction, and the specific flow resistance of the third area is less than that of the second area.

In another aspect of the invention, the method includes forming the fourth area, whose specific flow resistance is greater than that of the preceding area, by a radial deflection apparatus to quench gas flow.

In another aspect of the invention, the method includes forming respective cross-sectional constrictions, in the outlet flow channel, in the second and fourth areas, which have a higher specific flow resistance than their respective preceding areas.

In yet another aspect of the invention, the method includes forming the cross-sectional constrictions in the form of nozzles.

In another aspect of the invention, the method includes forming at least one of the areas having a higher specific flow resistance than that of the respective preceding area in the form of a check valve.

In another aspect of the invention, the method includes providing a linearly moving plate, which may close an opening, for each check valve.

In still another aspect of the invention, the method includes providing at least one closure flap, which can pivot about a hinge, in at least one of the check valves.

In another aspect of the invention, the method includes forming at least one of the areas having a higher specific flow resistance than that of the respective preceding area in the form of a body provided with a plurality of through-flow openings.

In another aspect of the invention, the method includes providing a flow damping device in at least one of the areas having a higher specific flow resistance than that of the respective preceding area.

In yet another aspect of the invention, the method includes extending the outlet flow channel from the nozzle constriction point to a drive side, and providing a drive-side vacuum interrupter to which one of the arcing contact pieces is fitted at least one of the areas having a higher specific flow resistance than that of the respective preceding area follows, in the outlet flow direction.

BRIEF DESCRIPTION OF THE DRAWINGS

An exemplary embodiment of the invention, further advantages and details will be explained in more detail in the following text with reference to the drawings in which.

DETAILED DESCRIPTION OF THE PREFERRED EMBODIMENT

Figure 1:
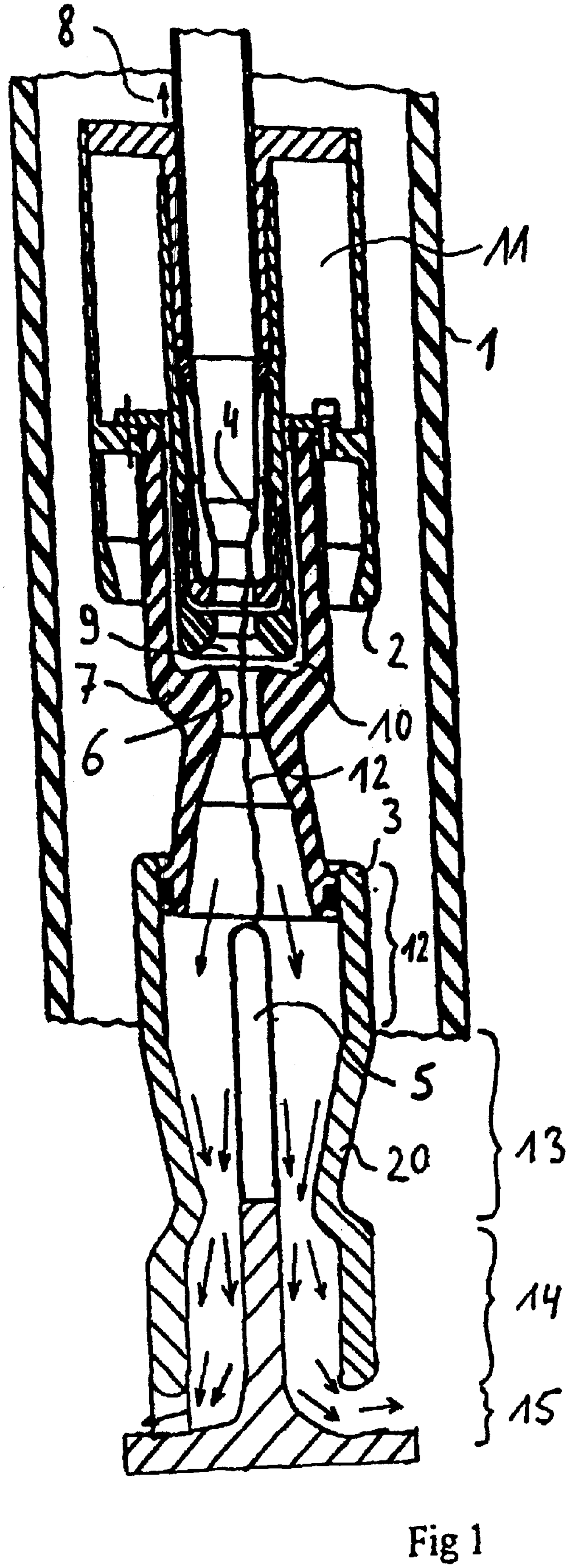
FIG. 1 shows a constriction point which is formed by a constriction in a contact tube surrounding the contact pin, according to the invention.

A high-voltage power breaker of the type mentioned above is provided, in which the outlet flow behaviour of the quenching gas through the outlet flow channel is optimized for arc quenching.

The first area, which faces the constriction point of the nozzle, has a specific flow resistance which is less than that of the constriction point, and the first area in the outlet flow direction of the quenching gas is followed by at least one second area, one third area and one fourth area. The specific flow resistance of the second area and of the fourth area, in each case, is greater than the specific flow resistance of the immediately preceding area in the outlet flow direction. The specific flow resistance of the third area is less than that of the second area.

The object is achieved according to the invention in that the first area, which faces the constriction point of the nozzle, has a specific flow resistance which is less than that of the constriction point, and in that the first area in the outlet flow direction of the quenching gas is followed by at least one second area, one third area and one fourth area, with the specific flow resistance of the second area, and of the fourth area, in each case being greater than the specific flow resistance of the immediately preceding area in the outlet flow direction, and in that the specific flow resistance of the third area is less than that of the second area.

Since areas having a higher specific flow resistance and areas having a lower specific flow resistance alternate in the outlet flow channel, the quenching gas in each case flows, being braked in the process, through an area having a higher specific flow resistance, in order then to expand in an area having a lower specific flow resistance, which effectively forms an expansion volume. This results in a build-up behaviour which produces a number of quenching gas build-up pressure waves which follow one another in time in the arcing area. This allows the time profile of the quenching gas pressure in the arcing area to be controlled, thus achieving a pressure profile which is optimized for arc quenching and for avoiding restriking of the arc.

In this context, the expression "specific flow resistance" means the flow resistance for the quenching gas over one unit length in the flow direction.

The invention can advantageously be used in insulating nozzle switches which are equipped with a heating area in which quenching gas which is heated up by the arc can be stored at high pressure until the current zero crossing of the current to be switched. In addition, a mechanical compression apparatus for the quenching gas can be provided in the form of a compression piston and a compression cylinder.

An embodiment of the invention provides that each of the areas having a higher specific flow resistance have cross-sectional constrictions in the outlet flow channel.

Such cross-sectional constrictions can be achieved, for example, by a conical constriction in a tube surrounding the outlet flow channel, for example in a tube to which the continuous current contact is fitted, or by a thickened region on a bolt running centrally in the outlet flow channel. A transmission for driving an arc contact piece can also be provided in the outlet flow channel, for example when both arcing contact pieces are moved simultaneously by a common switch drive. The transmission must then be taken into account when calculating the outlet flow cross sections.

Such cross-sectional constrictions can be achieved, for example, by means of a conical constriction in a tube surrounding the outlet flow channel, for example in a tube to which the continuous current contact is fitted, or by means of a thickened region on a bolt running centrally in the outlet flow channel. A transmission for driving an arc contact piece can also be provided in the outlet flow channel, for example when both arcing contact pieces are moved simultaneously by means of a common switch drive. The transmission must then be taken into account when calculating the outlet flow cross sections.

The areas which each have a higher specific flow resistance may advantageously each be in the form of a nozzle. Constrictions and nozzles in the outlet flow channel can each be formed by fittings composed of an insulating material, for example polytetrafluoroethylene, or else by fittings coated with such a material.

A further embodiment of the invention provides for one of the areas having a higher specific flow resistance than the preceding area to be in the form of a radial deflection apparatus for the quenching gas flow.

Such radial deflection may be provided, for example, in the form of a nozzle which deflects the quenching gas that is flowing out axially into a radial direction, or through more than 90°. A relatively large expansion area for the quenching gas can be provided downstream from the deflection device.

According to another embodiment of the invention, at least one of the areas having a higher flow resistance is in the form of a check valve or a group of check valves.

Firstly, this results in a build-up of the quenching gas, since part of the kinetic energy of the quenching gas has to keep the check valve open while, on the other hand, this reliably prevents the quenching gas flowing back, which could lead to the arcing area being contaminated with ionized hot quenching gas.

In this case, it may be advantageous for the check valve or valves to have a linearly moving plate, closing an opening. However, it is also possible to provide for at least one of the check valves to have at least one, and in particular two, closure flaps which can pivot about a hinge.

In a hinged valve, the flaps which can pivot can be pivoted virtually entirely out of the outlet flow channel in the flow direction, so that it is possible to achieve only a small increase in the specific flow resistance.

According to another embodiment of the invention, the areas having the higher specific flow resistance are formed by bodies which are arranged in the outlet flow channel and have a number of openings for the quenching gas to pass through.

Such bodies include, for example, perforated plates or metal meshes (mesh cooler).

According to another embodiment of the invention, at least one area has a higher specific flow resistance in the form of a flow labyrinth.

It is also possible to provide for at least one area having a higher specific flow resistance to be in the form of a chamber having inlet openings and outlet openings, in which moving bodies, for example PTFE balls are arranged, poured in loosely, according to an embodiment of the invention.

It is also advantageously possible to specify that the outlet flow channel will extend from the nozzle constriction point to one drive side, and that at least one of the areas having a higher specific flow resistance will follow, in the direction of the quenching gas flow, a drive-side vacuum interrupter to which the drive-side arcing contact piece is fitted, according to an embodiment of the invention.

FIGS. 1 to 8 show, schematically and in the form of a longitudinal section, a part of an interrupter unit of a high-voltage power breaker, with the areas having a higher specific flow resistance and having a lower specific flow resistance in the outlet flow area in each case being implemented differently on the side of the arcing contact piece, which is in the form of a contact pin.

FIG. 1 shows a part of an interrupter unit of a high-voltage power breaker having an insulating enclosure 1 which is composed, for example, of porcelain or consists of a composite insulator, and in which two continuous current contacts 2, 3 are arranged. In another embodiment of the invention, the enclosure may also be in the form of a grounded metal enclosure.

The moving continuous current contact piece 2 is connected to a moving arcing contact piece 4, which can be driven and is in the form of a tulip contact. This arcing contact piece has contact fingers arranged in a radially sprung manner on its circumference.

When connected, the arcing contact piece 4 which can be driven interacts with a stationary arcing contact piece 5 in the form of a contact pin. When connected, the latter passes through the constriction point 6 in the insulating nozzle 7 and makes contact, in a sprung manner, with the arcing contact piece 4 which can be driven.

If, when disconnected, the arcing contact piece 4 which can be driven is accelerated together with the insulating nozzle 7 and the continuous current contact piece 2 in the direction of the arrow 8 by a switch drive (which is not illustrated), then the continuous current contact pieces 2, 3 are separated from one another first of all, followed by the arcing contact pieces 4, 5.

An arc is struck between the arcing contact pieces 4, 5 in the arcing area 9, and the quenching gas, for example, $SF_6$ (sulfur hexafluoride) located there is heated up, so that it expands.

At least part of the expanded quenching gas is passed through a heating channel 10 into a heating area 11, where it is initially stored. When the alternating current to be switched passes through zero, the arc 12 is extinguished, and the quenching gas stored in the heating area 11 flows back through the heating channel 10 to the arcing area 9 where, by cooling, it prevents the arc from restriking when the next voltage rise takes place.

In the meantime, the arcing contact pieces 4, 5 are moved further apart from one another so that, after a short time, the distance between them is sufficiently large but there is no need to be concerned about restriking of the arc.

In order to create optimum conditions for the quenching of the arc in the arcing area and in the area of the nozzle constriction point 6, the present invention provides for the outlet flow channel, through which the quenching gas flows out for example on the side of the stationary arcing contact piece 5, initially to have a first area 12 whose specific flow resistance is less than that of the nozzle constriction point 6. The outlet flow cross section there is considerably greater than in the area of the nozzle constriction point 6.

The first area 12 is followed by a second area 13, whose specific flow resistance is higher than that of the first area. This second area is in the form of a constriction in the contact tube 20, to which the continuous current contact 3 is fitted. For this purpose, the second area has a conically tapering area and a nozzle constriction point.

The second area 13 is followed, in the flow direction of the quenching gas, by the third area 14, in which the outlet flow channel initially widens conically, followed by a cylindrical area, with the specific flow resistance in the third area being less than in the second area 13.

The third area 14 is followed by a fourth area 15, whose specific flow resistance is higher than that of the third area

14, and which is in the form of a device for radial deflection of the quenching gas flow outward.

The quenching gas flow is braked in both of the areas 13, 15, leading to a build-up of the quenching gas. Pressure waves thus run in the direction of the arcing area 9, in the opposite direction of the quenching gas flow.

These pressure waves, which move upstream, have an advantageous effect on the conditions for quenching the arc in the arcing area 9. The distances between the areas having a higher specific flow resistance and between the areas having a low specific flow resistance can be chosen so as to achieve optimum timing of the pressure build-up waves moving toward the arcing area, and thus to achieve an optimum time pressure profile there.

Figure 2:
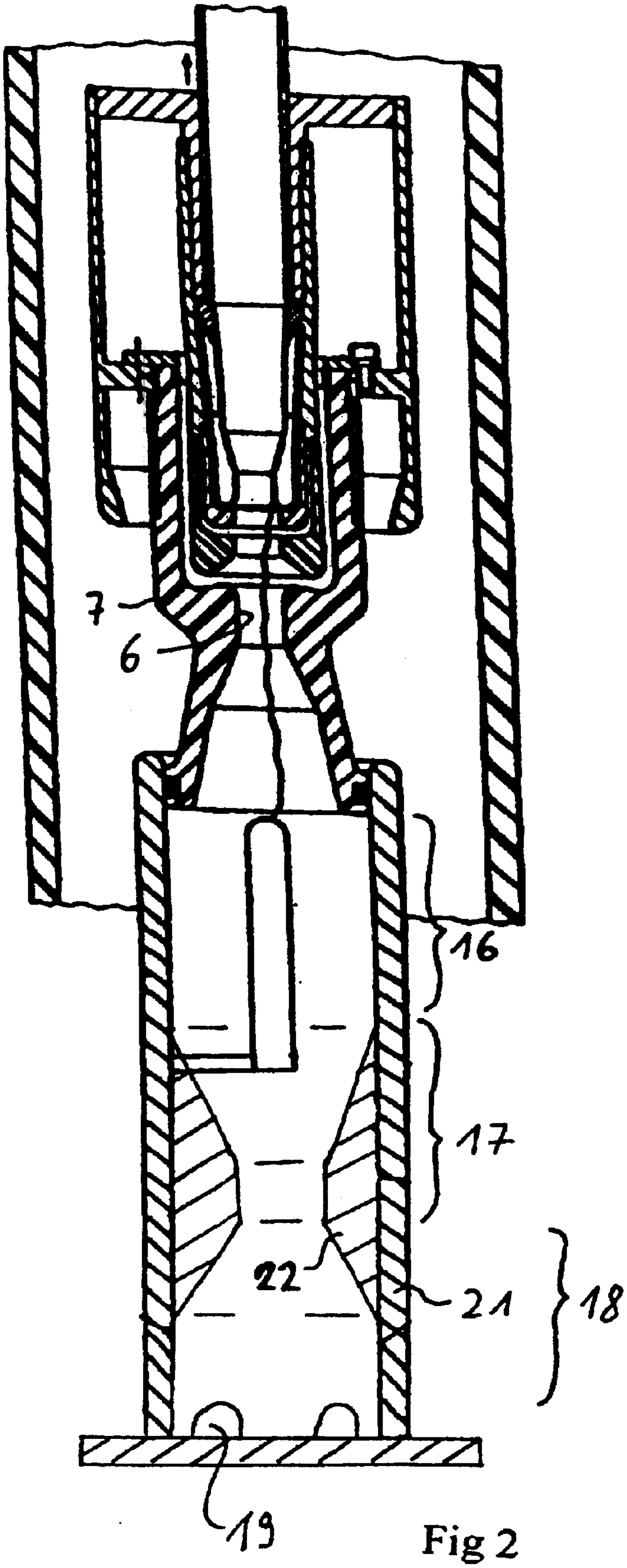
FIG. 2 shows a constriction which is formed by an insert in a contact tube, according to the invention.

FIG. 2 shows an arrangement which, except for the outlet flow channel, is identical to the arrangement illustrated in FIG. 1. There, a first area 16 of the outlet flow channel is provided, which is essentially cylindrical and has a lower specific flow resistance than the nozzle constriction point 6 in the insulating nozzle 7.

The first area 16 is followed by a second area 17, whose specific flow resistance is higher than that of the first area, due to the fact that the contact tube 21 has an insert 22 there, which produces a nozzle constriction point in the outlet flow channel. The insert 22 may also be an integral component of the contact tube 21.

The second area 17 is followed by a third area 18, in which the cross section of the outlet flow channel initially widens, so that the specific flow resistance there is less than in the second area 17. The widening part of the third area 18 opens into a cylindrical part.

The third area 18 is followed by a fourth area 19 in the form of radial openings through the contact tube 21, so that the quenching gas flow is deflected radially outward there, with the fourth area 19 having a higher specific flow resistance than that in the third area 18.

In this way, areas 16, 21 having a low specific flow resistance alternate with those areas 17, 19 having a higher flow resistance, so that the quenching gas flow is also partially backed-up in this implementation of the invention. In consequence, pressure waves can move back in the upstream direction of the quenching gas flow.

The quenching gas can expand to a certain extent in the areas 16, 21 having a lower specific flow resistance. In this way, the amount of quenching gas flowing out passes, successively in time, through back-up areas and expansion areas, so that the build-up can produce a specific time pattern of pressure waves. The time pressure wave profile which can be achieved in this way in the arcing area is dependent on the distance between the individual areas, and on the ratio of the respective specific flow resistances.

Figure 3:
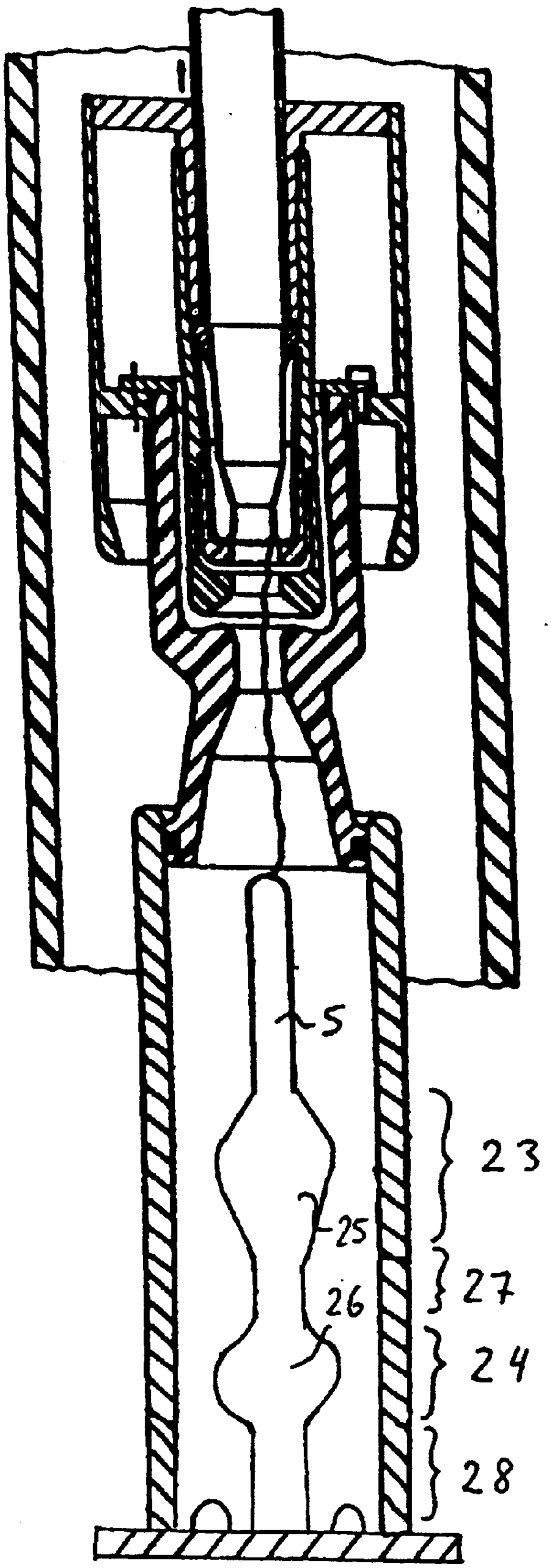
FIG. 3 shows two constrictions which are each formed by thickened regions on the contact pin, according to the invention.

FIG. 3 shows an embodiment of the invention in which areas 23, 24 having a higher specific flow resistance are produced by the contact pin 25 having thickened regions 25, 26 in these areas.

Parts of the contact pin 5 having a smaller diameter are provided between the thickened regions 25, 26, thus forming areas 27, 28 with a lower specific flow resistance there.

Figure 4:
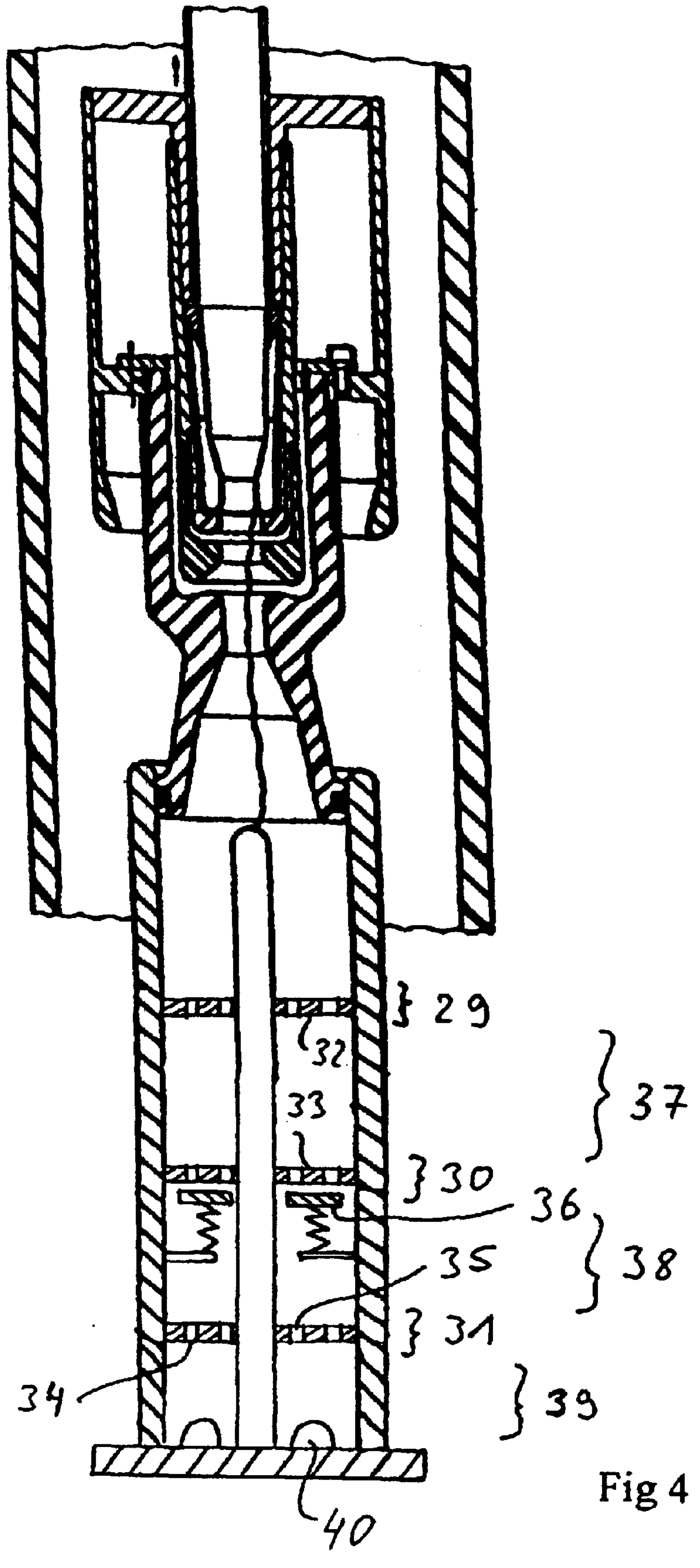
FIG. 4 shows three areas having a higher specific flow resistance which are formed by intermediate bases provided with through-openings, according to the invention.

According to the exemplary embodiment illustrated in FIG. 4, the areas 29, 30, 31 having a higher specific flow resistance are provided with plates 32, 33, 34, which have openings 35 for the quenching gas to pass through.

Closure plates 36 are also arranged on the plate 33, which close the openings in the plate 33 in a spring-loaded manner and are lifted off the plate 33 by the quenching gas flowing out, so that, although the quenching gas can flow away from the insulating nozzle 7, it cannot flow back.

Respective areas 37, 38 having a lower specific flow resistance are arranged as expansion volumes between the areas 29, 30, 31. The area 31 is followed by an area 39 having a lower specific flow resistance, which is followed by an area 40, in the form of radial outlet flow openings in the contact tube 21. These radial outlet flow openings 40 cause the gas flow to be deflected in the radial direction, and thus likewise represent an area having a higher specific flow resistance.

Figure 5:
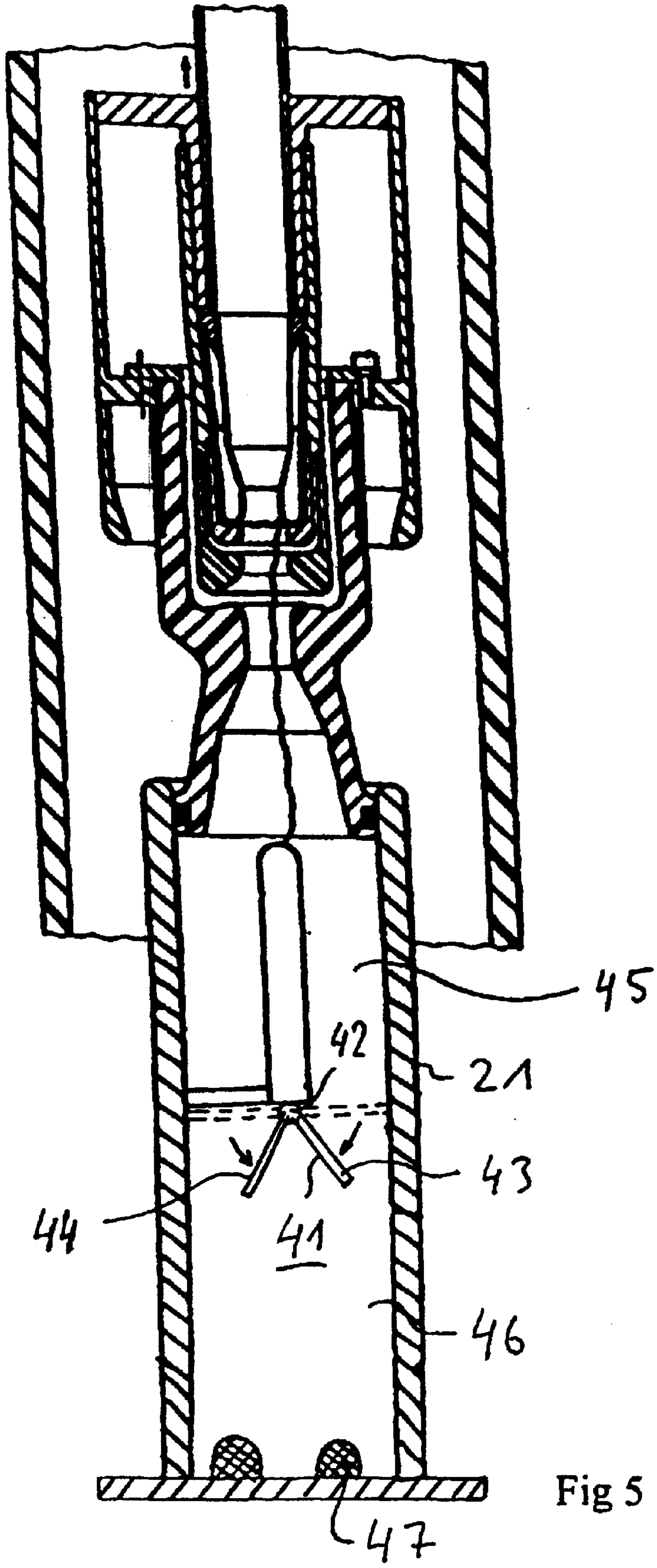
FIG. 5 shows an area having a higher flow resistance which is formed by a valve having flaps which can pivot, according to the invention.

FIG. 5 shows part of an interrupter unit, in which a check valve 41 is arranged in the contact tube 21, which has at least two flaps 43, 44, which can pivot about a hinge 42, close the cross section of the contact tube 21 in the rest state, and are opened by a gas flow on disconnection, so that the quenching gas can flow through the check valve that is formed. In addition, when it is open, the check valve forms an area having a higher specific flow resistance than the cylindrical area 45 of the contact tube 21. If an increased gas pressure builds up in the cylindrical area 46 following the check valve, then the quenching gas is prevented from flowing back through the valve 41.

The quenching gas can flow out of the cylindrical area 46 having a lower flow resistance through radial outlet flow openings 47, which are each provided with a metal mesh. The outlet flow openings 47 thus represent areas having a higher specific flow resistance. The quenching gas is deflected radially here, and is at the same time cooled and braked by the metal mesh.

Figure 6:
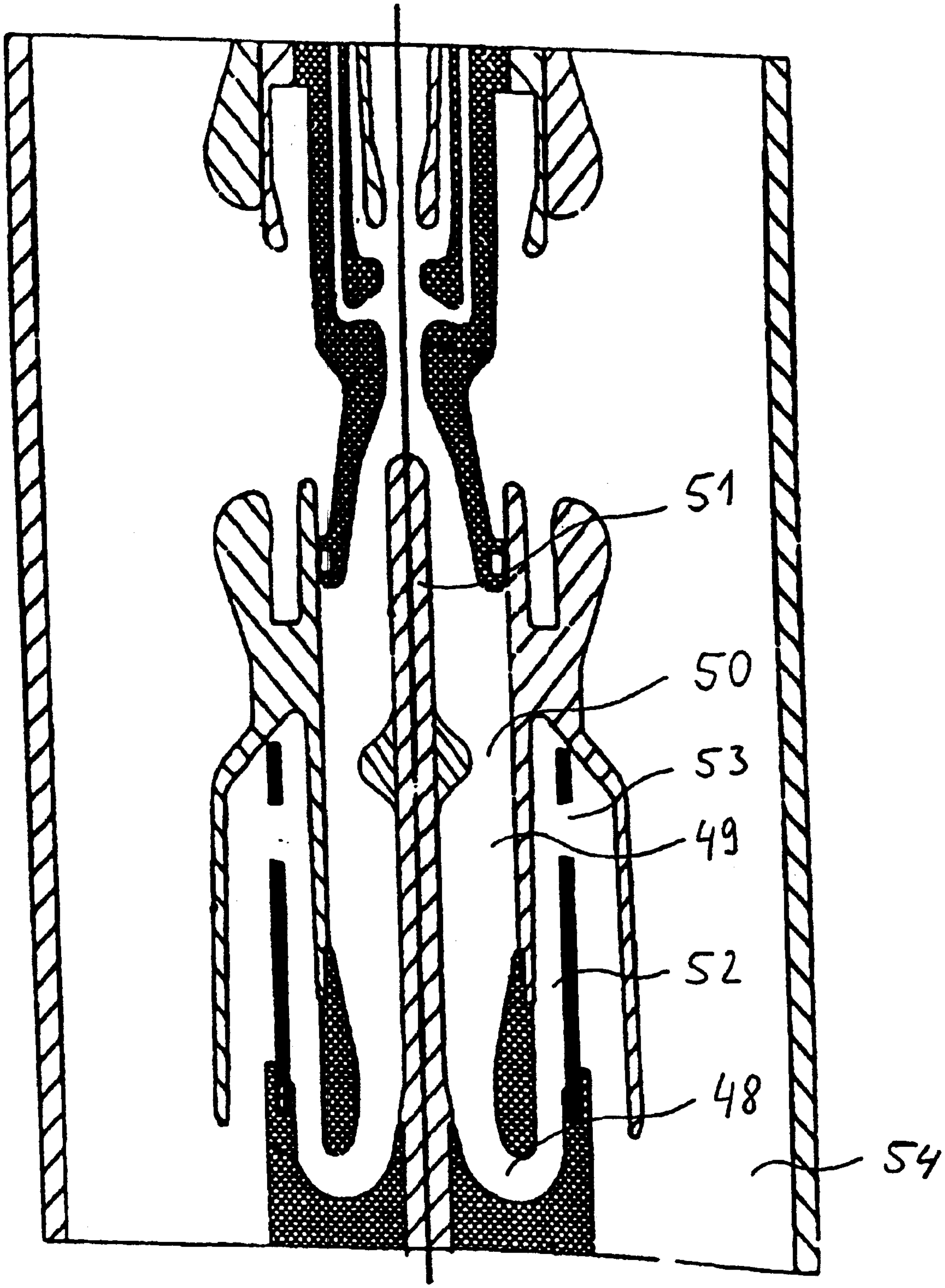
FIG. 6 shows an area having a higher flow resistance which is formed by a thickened region on a contact pin, and an area having a higher flow resistance which is formed by a device for radial gas deflection, according to the invention.

FIG. 6 shows an interrupter unit of a high-voltage power breaker, which has a radial deflection device 48 in the form of a nozzle, which is designed as an area having a higher specific flow resistance. This area 48 is preceded by a cylindrical area 49, which has a lower specific flow resistance. Before reaching this cylindrical area 49, the quenching gas flows through a constriction point 50, which is produced by a thickened region on the contact pin 51, and represents an area having a higher specific flow resistance.

The deflection device 48 is followed by an annular channel 52, out of which the quenching gas can flow through radial outlet flow openings 53 into the expansion area 54.

Figure 7:
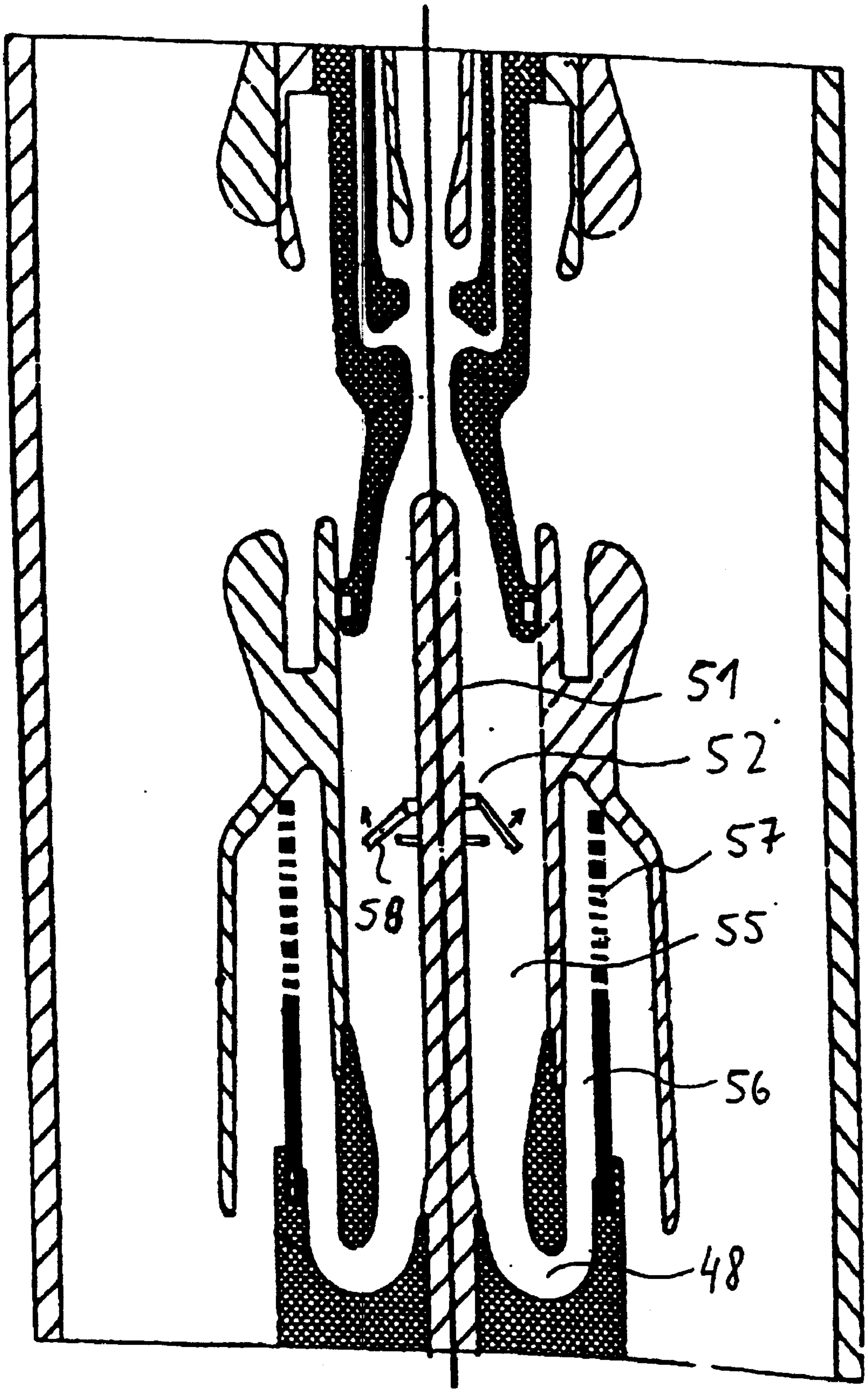
FIG. 7 shows an area having a higher flow resistance which is formed by a valve having flaps which can pivot and by a device for radial gas deflection according to the invention.

FIG. 7 shows an interrupter unit which is similar to the interrupter unit illustrated in FIG. 6 but in which, as shown in FIG. 7, the contact pin 51 does not have a thickened region, but has a check valve 52 which is provided with a number of plates 58 which can pivot, form an area having an increased specific flow resistance for the quenching gas flowing away from the arcing area, and are intended to prevent the quenching gas flowing back from the area 55 having a reduced specific flow resistance in the direction of the arcing area. The area 55 is followed by a deflection device 48, out of which the quenching gas can flow through an annular channel 56 to a metal grating 57. After being deflected once again, the quenching gas flows through the openings in the metal grating 57 into the expansion area 54.

Figure 8:
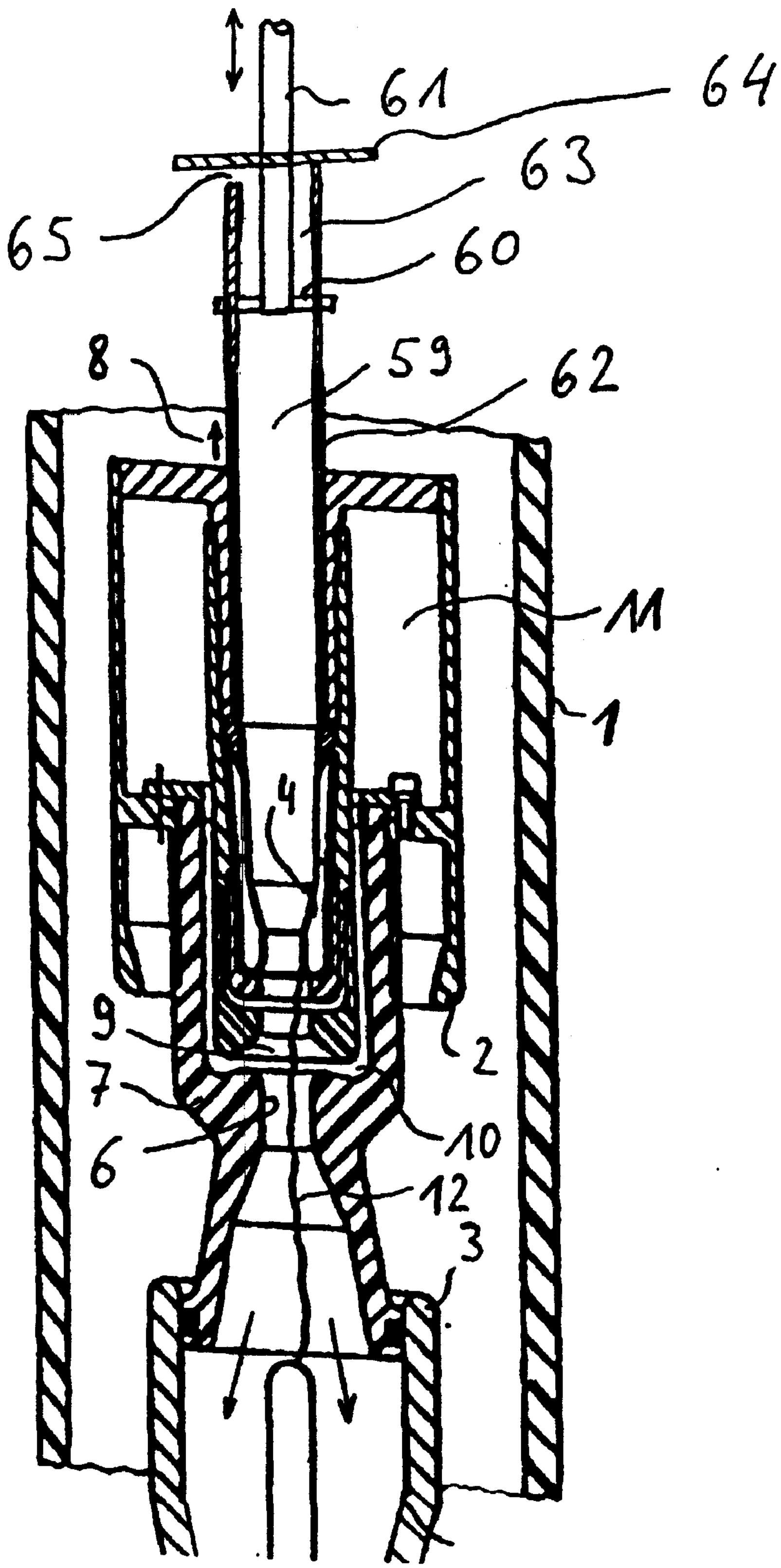
FIG. 8 shows a refinement of the outlet flow channel on the drive side according to the invention.

FIG. 8 shows an interrupter unit in which a first cylindrical area is provided within the vacuum interrupter in the drive-side outlet flow channel 59, and is fitted with the tulip-shaped arcing contact 4. The first area is followed by a further area 60, which is formed by coupling a switching rod 61 to the vacuum interrupter 62, and in which the specific flow resistance is increased by a cross-sectional constriction. The quenching gas can flow onward axially without any impediment in the third area 63, so that no build-up occurs there.

The fourth area is formed in front of a final plate 64, by the quenching gas being deflected through radial outlet openings 65 there, and emerging into an expansion area.

In summary, it can be stated that, in the case of the interrupter unit, there are various ways in which it is possible for areas having a lower specific flow resistance and areas having a higher specific flow resistance to alternate in the outlet flow channel, in which case areas having a higher specific flow resistance may be in the form of constriction points, metal meshes, perforated plates or check valves, while areas having a lower specific flow resistance may be in the form of cylindrical tubes or widening conical tubes.

It has been found to be advantageous for the flow to pass through at least one area having a lower specific flow resistance in the axial direction of the switch after passing through the insulating nozzle, which area is followed by an area having a higher specific flow resistance, through which the flow likewise passes in the axial direction of the switch, with the gas flow not being deflected radially until, at the earliest, after this latter area.

The outlet flow channel on the drive side may also be designed in a corresponding way to that described with reference to FIGS. 1 to 7, starting in the interior of the tulip-shaped arcing contact piece.

What is claimed is:

1. A high-voltage power breaker comprising:

two arcing contact pieces which are separated from one another when disconnected and between which an arc is struck in an arcing area filled with a quenching gas which has been heated by the arc;

an insulating nozzle surrounding the arcing area, an insulating nozzle including a constriction point from which the quenching gas flows in an outlet flow direction through at least one outlet flow channel having a number of areas which the quenching gas passes through successively, wherein a first area faces the constriction point of the nozzle and has a specific flow resistance which is less than that of the constriction point, the first area in the outlet flow direction of the quenching gas is followed by at least a second area, a third area and a fourth area, in which a specific flow resistance of the second area and of the fourth area, respectively, is greater than a specific flow resistance of an immediately preceding area in the outlet flow direction, and the specific flow resistance of the third area is less than that of the second area.

2. The high-voltage power breaker as claimed in claim 1, wherein the fourth area, whose specific flow resistance is greater than that of the preceding area, is formed by a radial deflection apparatus to quench gas flow.

3. The high-voltage power breaker as claimed in claim 1, wherein the second and fourth areas, which have a higher specific flow resistance than their respective preceding areas, each have cross-sectional constrictions in the outlet flow channel.

4. The high-voltage power breaker as claimed in claim 3, wherein the cross-sectional constrictions are in the form of nozzles.

5. The high-voltage power breaker as claimed in claim 1, wherein at least one of the areas having a higher specific flow resistance than that of the respective preceding area is in the form of a check valve.

6. The high-voltage power breaker as claimed in claim 5, wherein each check valve has a linearly moving plate which may close an opening.

7. The high-voltage power breaker as claimed in claim 5, wherein at least one of the check valves has at least one closure flap which can pivot about a hinge.

8. The high-voltage power breaker as claimed in one of claim 1, wherein at least one of the areas having a higher specific flow resistance than that of the respective preceding area is in the form of a body provided with a plurality of through-flow openings.

9. The high-voltage power breaker as claimed in claim 1, wherein at least one of the areas having a higher specific flow resistance than that of the respective preceding area has a flow damping device.

10. The high-voltage power breaker as claimed in claim 1, wherein the outlet flow channel extends from the nozzle constriction point to a drive side, and at least one of the areas having a higher specific flow resistance than that of the respective preceding area follows, in the outlet flow direction, a drive-side vacuum interrupter to which one of the arcing contact pieces is fitted.

11. A method of designing a high-voltage power breaker comprising:

providing two arcing contact pieces which are separated from one another when disconnected and between which an arc is struck in an arcing area filled with a quenching gas which has been heated by the arc;

providing an insulating nozzle surrounding the arcing area, the insulating nozzle including a constriction point from which the quenching gas flows in an outlet flow direction through at least one outlet flow channel having a number of areas which the quenching gas passes through successively, wherein a first area faces the constriction point of the nozzle and has a specific flow resistance which is less than that of the constriction point, the first area in the outlet flow direction of the quenching gas is followed by at least a second area, a third area and a fourth area, in which a specific flow resistance of the second area and of the fourth area, respectively, is greater than a specific flow resistance of an immediately preceding area in the outlet flow direction, and the specific flow resistance of the third area is less than that of the second area.

12. The method of claim 11, further comprising forming the fourth area, whose specific flow resistance is greater than that of the preceding area, by a radial deflection apparatus to quench gas flow.

13. The method of claim 11, further comprising forming respective cross-sectional constrictions, in the outlet flow channel, in the second and fourth areas, which have a higher specific flow resistance than their respective preceding areas.

14. The method of claim 13, further comprising forming the cross-sectional constrictions in the form of nozzles.

15. The method of claim 11, further comprising forming at least one of the areas having a higher specific flow resistance than that of the respective preceding area in the form of a check valve.

16. The method of claim 15, further comprising providing a linearly moving plate, which may close an opening, for each check valve.

17. The method of claim 15, further comprising providing at least one closure flap, which can pivot about a hinge, in at least one of the check valves.

18. The method of claim 11, further comprising forming at least one of the areas having a higher specific flow resistance than that of the respective preceding area in the form of a body provided with a plurality of through-flow openings.

19. The method of claim 11, further comprising providing a flow damping device in at least one of the areas having a higher specific flow resistance than that of the respective preceding area.

20. The method of claim 11, further comprising extending the outlet flow channel from the nozzle constriction point to a drive side, and providing a drive-side vacuum interrupter to which one of the arcing contact pieces is fitted at least one of the areas having a higher specific flow resistance than that of the respective preceding area follows, in the outlet flow direction.

* * * * *